`3,410,901`
1-ARYLOXY-3-[N-(α-METHYL-β-HYDROXYPHEN-ETHYL)-N-METHYLAMINO]-2-PROPANOLS
Wilhelm Kunz and Haireddin Jacobi, Monheim, Rhineland, and Konrad Koch, Dusseldorf-Urdenbach, Germany (all of 1500 Spring Garden St., Philadelphia, Pa. 19101)
No Drawing. Filed May 4, 1966, Ser. No. 547,448
Claims priority, application Germany, June 22, 1965, S 97,718
10 Claims. (Cl. 260—570.6)

ABSTRACT OF THE DISCLOSURE 1-naphthyloxy- or substituted phenoxy-3-[N-(α-methyl-β-hydroxyphenethyl)-N-methylamino]-2-propanols obtained preferably by reaction of a pseudoephedrine with an arylglycide are spasmolytics.

---

This invention relates to novel 1-substituted-3-[N-(α-methyl-β-hydroxyphenethyl) - N - methylamino]-2-propanols having the general formula:

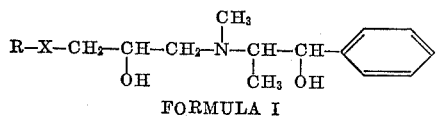

FORMULA I where: R represents a naphthyl radical or phenyl substituted by, for example, one or more halogens, lower alkyl which may be straight or branched, saturated or unsaturated, halogenalkyl, lower alkoxy, carboxy, carboxamide, carbalkoxy, lower alkyl carbonyl, hydroxy, nitro, amino, lower alkanoylamino or phenyl groups; and X represents oxygen or sulfur.

These compounds have valuable spasmolytic properties and more specifically have papaverine-like effects without having the anticholinergic side effects such as mydriasis and mouth-dryness which are characteristic of conventional anticholinergic substances. Further, these compounds have their primary utility as gastrointestinal spasmolytics. Also similarly useful are the salts of the compounds of Formula I with physiologically neutral acids.

Preferred compounds of this invention have the following formula:

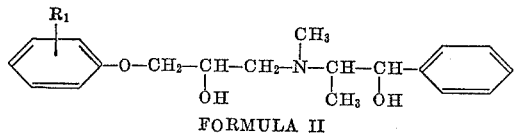

FORMULA II where $R_1$ represents halogen atoms, for example chlorine, bromine or fluorine, lower alkyl, or lower alkoxy radicals with 1 to 4 carbon atoms.

The compounds of Formula I are prepared by one of several methods known to the art, outlined as follows wherein R and X are as defined above. In one method a pseudoephedrine is reacted with an arylglycide having the general formula:

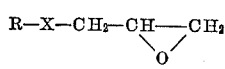

at an elevated temperature, if necessary in the presence of an inert solvent, or with a compound having the general formula:

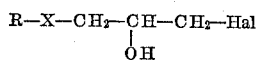

where Hal represents chlorine, bromine or iodine, at an elevated temperature, if necessary in the presence of an inert solvent and/or an acid absorbent.

In a second method a 1-pseudoephedrino-2,3-oxidopropane or a 1-pseudoephedrino-2-hydroxypropyl halide is reacted with a phenol or naphthol, R—OH, at an elevated temperature, if necessary in the presence of an inert solvent and/or an alkaline condensing agent.

In a third method a compound having the general formula:

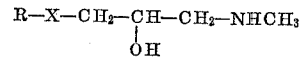

is reacted with a 2-halo-3-hydroxy-3-phenylpropane, preferably 2-chloro, at an elevated temperature, if necessary in the presence of an inert solvent and/or an acid absorbent.

In a fourth method a compound having the general formula:

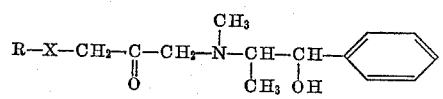

is reduced for example by hydrogenation in the presence of a suitable catalyst, such as platinum oxide, if necessary in the presence of an inert solvent.

In a fifth method a compound having the general formula:

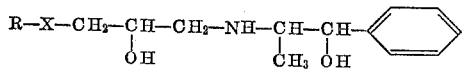

is reacted with a methylating agent, such as a methyl halide, dimethylsulfate or formic acid (according to the Eschweiler-Clark procedure), if necessary at an elevated temperature and in the presence of an inert solvent.

In the above methods, preferably equimolar ratios of reactants are employed. The salts of the compounds of Formula I are prepared from the bases according to methods which are known per se, such as reaction of the bases and acids in equivalent quantities in a suitable, for example organic, solvent such as a lower aliphatic alcohol, and precipitation by adding a second organic solvent, for example ether, miscible with the first solvent but in which the salt is insoluble.

The compounds of this invention including their salts may be obtained in modified forms, that is diastereoisomers, with different melting points and different values of optical rotation, however with the same values regarding elemental analysis. By the disclosure and claims it is intended to cover all such isomeric compounds.

EXAMPLE 1

To 17.2 g. of 1-(o-bromophenoxy)-2,3-epoxypropane dissolved in 100 ml. of ethanol is added 12.4 g. of L-pseudoephedrine. After heating at reflux in an oil bath for approximately ten hours, the solvent is distilled off in vacuo. The residue is dissolved in benzene and hydrogen chloride is added to the solution. The precipitated L-1-(o - bromophenoxy)-3-[N-(α-methyl-β-hydroxyphenethyl)-N-methylamino]-2-propanol hydrochloride is purified first with ethyl acetate and subsequently with isopropanol, M.P. 166–168° C. $[\alpha]_D^{20}=-19.7°$ (concentration=2.5% in methanol).

*Elementary analysis.*—$C_{19}H_{24}BrNO_3 \cdot HCl$; molecular weight 430.79. Calculated: N, 3.25; HCl, 8.47. Found: N, 3.23; HCl, 8.42, 8.48.

A separated diastereoisomer has a melting point of 143–144.5° C. and an optical rotation, $[\alpha]_D^{25}$, value of −52.2° (concentration=2.5% in methanol). The infrared absorption spectrum of this isomer contains a strong absorption bond at 12.75μ.

EXAMPLE 2

As described in Example 1, DL-1-(o-bromophenoxy)-

3-[N-(α-methyl-β-hydroxyphenethyl)-N-methylamino]-2-propanol hydrochloride is obtained from 14 g. of 1-(o-bromophenoxy)2,3-epoxypropane and 10 g. of DL-pseudoephedrine in 100 ml. of ethanol, M.P. 165–167° C.

*Elementary analysis.*—$C_{19}H_{24}BrNO_3 \cdot HCl$; molecular weight 430.79. Calculated: N, 3.25; HCl, 8.47. Found: N, 3.28; HCl, 8.52.

EXAMPLE 3

As described in Example 1, L-1-(o-methoxyphenoxy)-3-[N-(α-methyl-β-hydroxyphenethyl)-N-methylamino]-2-propanol hydrochloride is obtained from 18 g. of 1-(o-methoxyphenoxy)-2,3-epoxypropane and 16.5 g. of L-pseudoephedrine in 100 ml. of benzene, M.P. 103–105° C.

*Elementary analysis.*—$C_{20}H_{27}NO_4 \cdot HCl$; molecular weight 381.91. Calculated: N, 3.67; HCl, 9.55. Found: N, 3.62; HCl, 9.49.

EXAMPLE 4

Similarly, as described in Examples 1–3, corresponding 1-substituted-3-[N-(α-methyl-β-hydroxyphenethyl)-N-methylamino]-2-propanols are prepared by reacting a pseudoephedrine with any of the following 1-substituted-2,3-epoxypropanes:

1-(p-chlorophenoxy)-2,3-epoxypropane
1-(o-, m- and p-tolyloxy)-2,3-epoxypropane
1-(p-methoxyphenoxy)-2,3-epoxypropane
1-(1- and 2-naphthyloxy)-2,3-epoxypropane
1-(o-, m- and p-nitrophenoxy)-2,3-epoxypropane
1-(2,6- and 3,4-xylyloxy)-2,3-epoxypropane.

What is claimed is:
1. A chemical compound or a nontoxic acid addition salt thereof, said compound having the formula:

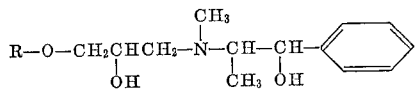

wherein R is mono halophenyl, mono lower alkylphenyl, mono lower alkoxyphenyl, mono nitrophenyl, xylyl, 1-naphthyl or 2-naphthyl.

2. A compound in accordance with claim 1 in which R is mono halophenyl.

3. A compound in accordance with claim 2 in which R is o-bromophenyl.

4. A compound in accordance with claim 3 in which the configuration is L.

5. A compound in accordance with claim 4 in the form of a hydrochloride salt which has a melting point of 143–144.5° C. and an optical rotation, $[\alpha]_D^{25}$, value of $-52.2°$ (concentration=2.5% in methanol).

6. A compound in accordance with claim 1 in which R is mono lower alkylphenyl.

7. A compound in accordance with claim 6 in which R is o-tolyl.

8. A compound in accordance with claim 1 in which R is mono lower alkoxyphenyl.

9. A compound in accordance with claim 8 in which R is o-methoxyphenyl.

10. A compound in accordance with claim 1 in which R is 1-naphthyl or 2-naphthyl.

References Cited

UNITED STATES PATENTS

| | | | |
|---|---|---|---|
| 3,192,253 | 6/1965 | Boscott et al. | 260—570.7 XR |
| 3,275,629 | 9/1966 | Baizer | 260—570.7 XR |
| 3,322,758 | 5/1967 | Thiele et al. | 260—570.8 XR |

OTHER REFERENCES

Roth: Chemical Abstracts, vol. 53, pp. 21640–41 (1959).

CHARLES B. PARKER, *Primary Examiner.*
ROBERT V. HINES, *Assistant Examiner.*